US012632614B2

(12) United States Patent
Cheung et al.

(10) Patent No.: US 12,632,614 B2
(45) Date of Patent: May 19, 2026

(54) COMPUTER AIDED DRAWING DRAFTING AUTOMATION FROM MARKUPS USING MACHINE LEARNING

(71) Applicant: Autodesk, Inc., San Rafael, CA (US)

(72) Inventors: Kin Ming Kevin Cheung, Singapore (SG); Ravinder P. Krishnaswamy, San Francisco, CA (US); Damian Paul Stephen Willcox, Calgary (CA)

(73) Assignee: AUTODESK, INC., San Francisco, CA (US)

( * ) Notice: Subject to any disclaimer, the term of this patent is extended or adjusted under 35 U.S.C. 154(b) by 1078 days.

(21) Appl. No.: 17/514,740

(22) Filed: Oct. 29, 2021

(65) Prior Publication Data

US 2022/0156419 A1 May 19, 2022

Related U.S. Application Data

(60) Provisional application No. 63/114,952, filed on Nov. 17, 2020.

(51) Int. Cl.
*G06F 30/12* (2020.01)
*G06F 3/0488* (2022.01)
(Continued)

(52) U.S. Cl.
CPC .............. *G06F 30/12* (2020.01); *G06F 30/27* (2020.01); *G06V 30/153* (2022.01);
(Continued)

(58) Field of Classification Search
None
See application file for complete search history.

(56) References Cited

U.S. PATENT DOCUMENTS 5,251,268 A * 10/1993 Colley et al. ............ C06K 9/62
5,761,328 A * 6/1998 Soldberg et al. ........ G06K 9/00
(Continued)

FOREIGN PATENT DOCUMENTS

| CN | 101553771 | 10/2009 | |
| CN | 111382778 | 7/2020 | |
| JP | 2018206250 A * | 12/2018 | ............. G06F 17/50 |

OTHER PUBLICATIONS

EPA, "Brownfields Redevelopment and Land Revitalization." Last modified Feb. 21, 2016. https://archive.epa.gov/socal/web/html/brownfields.html (Year: 2016).*

(Continued)

*Primary Examiner* — Rehana Perveen
*Assistant Examiner* — Kyle H Tseng
(74) *Attorney, Agent, or Firm* — Gates & Cooper LLP

(57) ABSTRACT

A method and system provide for computer aided drawing (CAD) automation. A CAD drawing in a first format that is native to a CAD application is obtained. Markup for the CAD drawing that is in a second non-native format is acquired. A machine learning engine processes the markup using a machine learning model, to identify a markup type, identify markup properties, correlate, the markup to a CAD object needed to update the CAD drawing, and determine, CAD object properties and CAD application properties. The CAD object with the CAD object properties is provided in the CAD application using the CAD application properties. User input is accepted and the CAD drawing is updated based thereon. The machine learning model is updated based on the user input and utilized to process future markups.

16 Claims, 8 Drawing Sheets

(51) Int. Cl.
| | |
|---|---|
| *G06F 30/27* | (2020.01) |
| *G06F 111/12* | (2020.01) |
| *G06V 30/10* | (2022.01) |
| *G06V 30/148* | (2022.01) |

(52) U.S. Cl.
CPC ........ *G06F 3/0488* (2013.01); *G06F 2111/12* (2020.01); *G06V 30/10* (2022.01)

(56) References Cited

U.S. PATENT DOCUMENTS

| | | | |
|---|---|---|---|
| 2002/0055955 A1 | 5/2002 | Lloyd-Jones et al. | |
| 2012/0116728 A1* | 5/2012 | Shear et al. | G06F 17/50 |
| 2014/0380191 A1* | 12/2014 | Rotbaein | H04L 29/06 |
| 2019/0205484 A1 | 7/2019 | Morkos et al. | |
| 2019/0325089 A1 | 10/2019 | Golparvar-Fard et al. | |
| 2020/0265121 A1 | 8/2020 | Myers et al. | |

OTHER PUBLICATIONS

AeroCAD et al., "Back Drafting Color Codes." CADTutor. Apr. 13, 2011. https://www.cadtutor.net/forum/topic/29873-back-drafting-color-codes/ (Year: 2011).*

Zhang, Fan et al. "DetReco: Object-Text Detection and Recognition Based on Deep Neural Network." Mathematical Problems in Engineering, Jul. 14, 2020 (Year: 2020).*

T. Cheng, J. Khan, H. Liu and D. Y. Y. Yun, "A symbol recognition system," Proceedings of 2nd International Conference on Document Analysis and Recognition (ICDAR '93), Tsukuba, Japan, 1993, pp. 918-921, doi: 10.1109/ICDAR.1993.395587. (Year: 1993).*

F. S. Khan, R. M. Anwer, J. van de Weijer, A. D. Bagdanov, M. Vanrell and A. M. Lopez, "Color attributes for object detection," 2012 IEEE Conference on Computer Vision and Pattern Recognition, Providence, RI, USA, 2012, pp. 3306-3313, doi: 10.1109/CVPR.2012.6248068. (Year: 2012).*

Park, Jaewoo, Isaac Kang, Junhyeong Kwon, Eunji Lee, Yoonsik Kim, Sujeong You, Sang Hoon Ji, and Nam-ik Cho. "Recognition of assembly instructions based on geometric feature and text recognition." In 2020 17th International Conference on Ubiquitous Robots (UR), pp. 139-143. IEEE, 2020. (Year: 2020).*

Savage, Valkyrie, Sean Follmer, Jingyi Li, and Björn Hartmann. "Makers' marks: Physical markup for designing and fabricating functional objects." In Proceedings of the 28th Annual ACM Symposium on User Interface Software & Technology, pp. 103-108. 2015. (Year: 2015).*

European Examination Report dated Dec. 2, 2024 for European Patent Application No. 21208483.4.

Extended European Search Report dated Apr. 7, 2022 for European Patent Application No. 21208483.4.

Non-Final Office Action dated Dec. 12, 2024 for U.S. Appl. No. 17/461,541.

Chinese Office Action (with English translation) dated Jun. 17, 2025 for Chinese Patent Application No. 2021112869022.

Chinese Office Action (with English translation) dated May 16, 2025 for Chinese Patent Application No. 2021113312938.

Notice of Allowance dated Jul. 10, 2025 for U.S. Appl. No. 17/461,541.

European Communication under Rule 71(3) EPC dated Dec. 18, 2025 for European Patent Application No. 21208417.2.

Chinese Notification of Allowance dated Jan. 29, 2026 for Chinese Patent Application No. 2021112869022.

\* cited by examiner

OBTAIN CAD DRAWING — 602

ACQUIRE MARKUP — 604

PROCESS MARKUP IN ML ENGINE — 606

PROVIDE CAD OBJECT IN CAD APPLICATION — 608

ACCEPT USER INPUT — 610

UPDATE CAD DRAWING — 612

UPDATE ML MODEL — 614

COMPUTER AIDED DRAWING DRAFTING AUTOMATION FROM MARKUPS USING MACHINE LEARNING

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 63/114,952, filed on Nov. 17, 2020, with inventor(s) Kevin Cheung, Ravinder P. Krishnaswamy, and Damian Paul Stephen Willcox, entitled "Optical Character Recognition (OCR) for Drafting Using Machine Learning Assisted Drafting Automation from Markups Using Machine Learning".

BACKGROUND OF THE INVENTION

1. Field of the Invention

The present invention relates generally to computer-aided design (CAD) applications, and in particular, to a method, apparatus, system, and article of manufacture for simplifying, automating, saving time, and reducing errors in the drafting process.

2. Description of the Related Art

Once a CAD drawing has been created, various parties involved in the design and construction process may provide edits/modifications to the drawing. Drawing edits are often prompted by feedback, typically in the form of markups that involve using physical means such as pens/pencils of different colors on a paper printout, or are created digitally by annotating a digital file such as a PDF (portable document format) file.

In both cases, the markup must be manually delivered back to the drafter, and the drafter must reference paper on their desk or a PDF in another application on a separate monitor. Thereafter, the drafter goes back to a CAD application to make the changes with proper CAD application objects using the correct standards (e.g., layer, styles (dimension, text, etc.), colors, etc.). In other words, a collaborator may add markup in low fidelity with a pen/paper along with indications/instructions of things to add/change. Thereafter, the drafter returns back to a CAD application and issues manual commands and/or draws/repeats the collaborator's markups into the CAD application. FIG. 1 illustrates the prior art process of creation, markup, and incorporation of changes. More specifically, a CAD drawing/design 100 and markups 104 for requested changes (e.g., that are drawn on a paper printout 102 or a PDF of the drawing 100 by collaborator 106) are acquired by the drafter 108 (who has the necessary CAD drawing/drafting experience/skillset). The drafter 108 then manual drafts/updates/incorporates the requested changes into the drawing 100 (i.e., using the CAD application) to produce the revised drawing 100R.

In view of the above, the drafter 108 must have the knowledge base/skill set regarding how to use and create the markups in the CAD application. However, while the prior art requires drafter 108 to have such a skill set, the markups/feedback are usually not created by the drafter 108 but by the collaborator 106 (i.e., a different person) without such a knowledgebase/skill set. In the prior art, the need to manually update the CAD drawing 100 combined with the lack of an experienced CAD application skill set of the collaborator 106 necessitates the drafter 108 and a slow manual process. This round-trip feedback creation and manual update process is slow, error prone, and lacks any connection of the feedback to the original design file.

Accordingly, prior art systems have not been successful in bringing markup data 104 back into the design files 100 in general across multiple applications (e.g., CAD applications, modeling applications, etc.). Further, there have been several prior art efforts in which various tools have been created to create markups 104 in a derivative output of the design files (DWFs [design web format], PDFs, viewers, etc.). Processes such as PDF import functions or image import functions within CAD applications (e.g., available in the AUTOCAD™ application) allow users to bring a PDF of the entire drawing plus markups they are working on, but there are obvious redundancies and no distinction between markup and design drawing. In other words, the imported image may be a raster-based image that does not separate the markups from the underlying drawing—a single raster image file is imported.

Further, prior art systems have not interpreted markups after-the-fact into CAD application objects. In addition, there have been various prior art efforts to make markup tools more intelligent such as allowing gesture recognition to create a circle or revCloud (revision cloud [polylines that consist of sequential arcs to form a cloud-shaped object]) or other objects, for example. However, these prior art efforts are aimed at neater markups for the collaborator providing the feedback. The drafter still needs to make sure the CAD application objects are correct, on the right layer, using the right layer style and so forth.

SUMMARY OF THE INVENTION

To overcome the problems of the prior art, embodiments of the invention build off of a CAD application trace feature (i.e., the AUTOCAD TRACE feature). A trace feature may provide a safe space in a CAD application where markups can exist within the context of the design CAD drawing, but not interfere with it. In other words, embodiments of the invention utilize a safe feature that allows a safe space for markup feedback to be stored and created without affecting the drawing contents/geometry, and further utilize machine learning (ML) to help the drafter complete their work quickly and accurately while still maintaining review and intervention by the drafter when needed.

Embodiments of the invention utilize ML to identify particular markups regardless of how they were created and correlate them with the intended CAD application objects that would be needed to update the CAD drawing file. In short, handwritten notes, dimensions, revClouds, and instructions to modify the CAD drawing would be understood by ML, and assist the drafter to update their CAD drawing by providing the corresponding CAD application object in the right location with the correct styling.

Embodiments of the invention also differentiate colorings of markups, as markups in the design phase of projects tend to follow standard colors (red means literal additions—add these notes, dimensions, clouds on the drawing as CAD application objects, whereas blue is instructional "move these objects" as opposed to putting the text "move these objects" on the CAD drawing itself).

Accordingly, embodiments of the invention use ML to get a sense of text styles, dimension styles, usage patterns and so on to ensure the geometry is created on the right layer, and with the right properties.

Unique capabilities of embodiments of the invention include the attempt to replicate the work the drafter would normally do in a CAD application when the drafter receives a markup indicating changes needing to be made to the drawing. In this regard, people providing feedback are quite often not aware of the drafting standards and other CAD specific information that the drafter is relied on to provide. Also, while prior art systems may have tried to improve markup tools, prior art systems have never tried to bridge the gap between markup and drafting (correctly) while still maintaining the markup as a record of a requested change, and the CAD drawing edits themselves which often get blurred in these areas.

Advantages of embodiments of the invention include a significant improvement to the drafting process, with a decrease in the time taken to modify drawings through the primary mechanism used for feedback—the markup. Less time spent drafting, with less errors is not only compelling to the drafter themselves, but also right up to the corporate level where companies can see gains in accuracy, efficiency, and output—allowing a company to use it as a competitive advantage in project turnaround and outbid their competitors.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention. Assisted Drafting Automation from Markups Assisted by Machine Learning (ML)

Embodiments of the invention utilize machine learning to recognize markup/redlines input from a collaborator (i.e., in a non-CAD application). The machine learning processes the input and recognizes both literal markups as well as instructional markups. Such recognized markups can be used: (i) as suggestions (for the user to accept), or (ii) to autonomously update the CAD drawing within the CAD application with proper CAD application objects using the correct CAD application standards.

Figure 1:
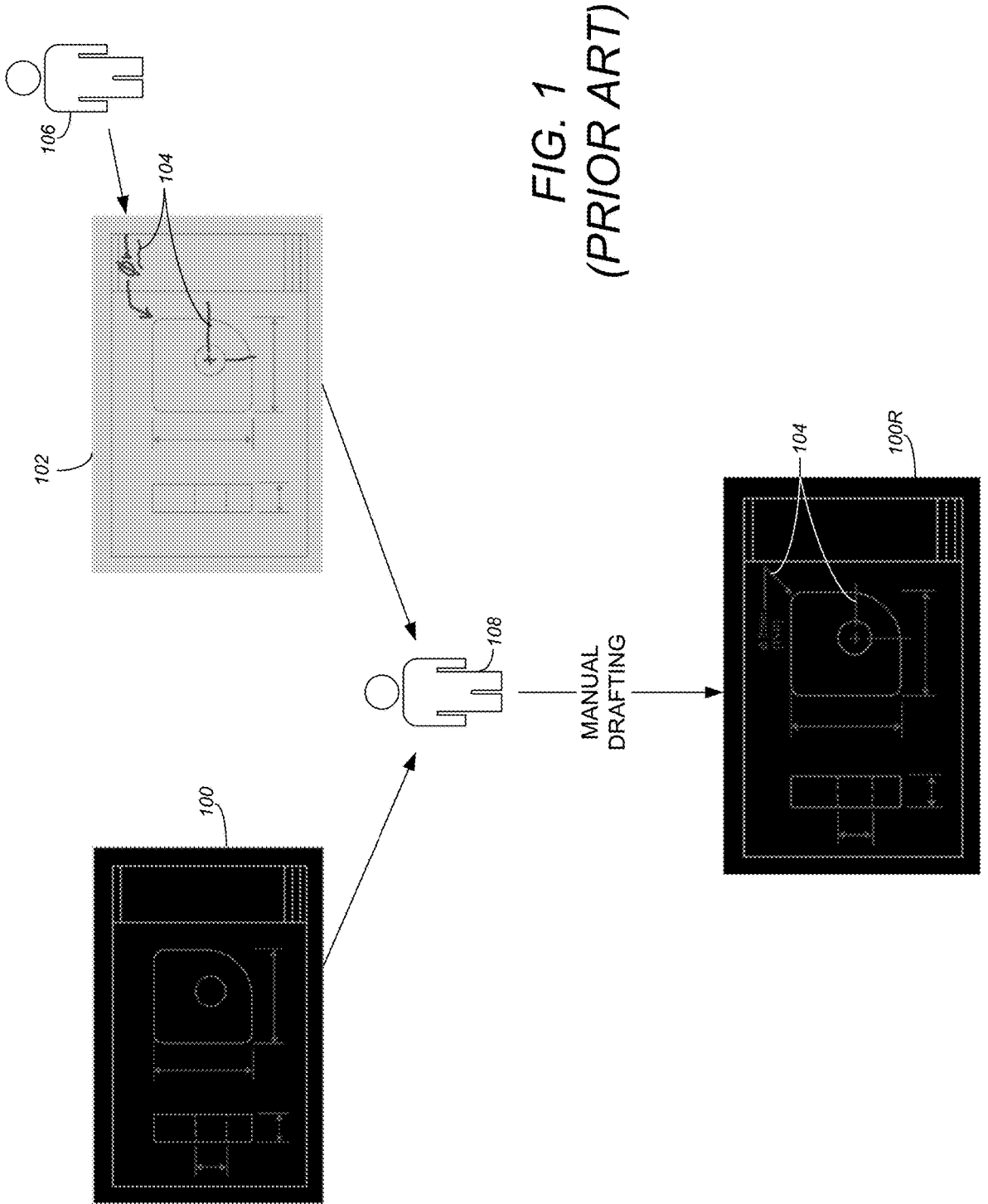
FIG. 1 illustrates the prior art process of creation, markup, and incorporation of changes.
Figure 2:
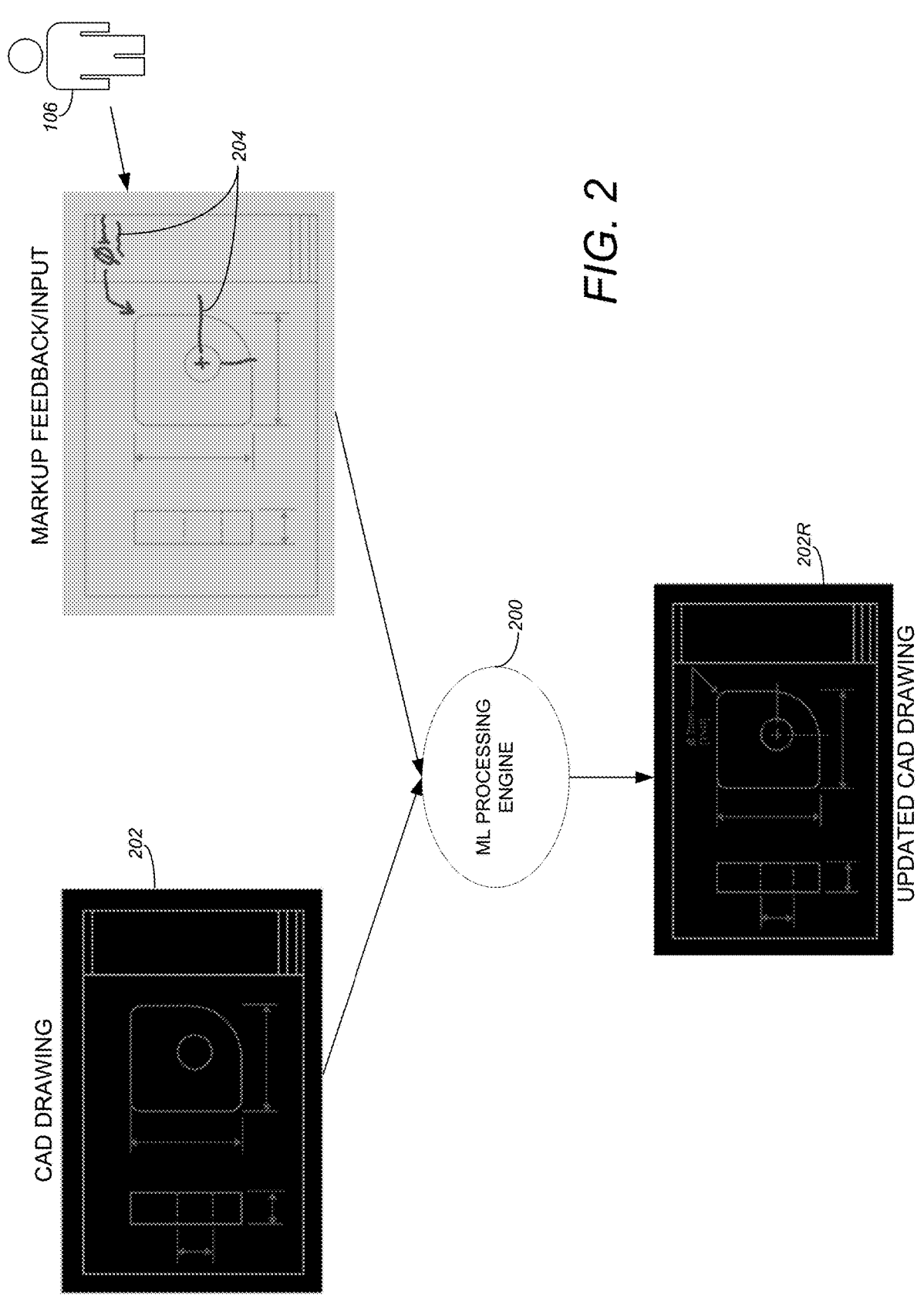
FIG. 2 illustrates the workflow for assisted drafting automation from markups using machine learning in accordance with one or more embodiments of the invention.

FIG. 2 illustrates the workflow for assisted drafting automation from markups using machine learning in accordance with one or more embodiments of the invention. The ML processing engine 200 receives the markup feedback/input 204 (which may be scanned/photographed from paper markups or may be a PDF that includes the markups). The ML processing engine 200 processes the markup feedback/input 204 and recognizes the different markups (e.g., literal and/or instructional) (e.g., based on an ML model). In one or more embodiments, the recognition process may utilize optical character recognition (OCR) or other image processing/recognition techniques based on an ML model that may be iteratively updated via subsequent markup processing cycles. To differentiate between hand-drawn and printed entities, embodiments of the invention may utilize entity matching techniques, color, etc. Further, once an entity/object has been scanned/identified, a user may be prompted to acknowledge/confirm the scanned entity/identification.

In embodiments of the invention, a QR code or other identifier in the document containing the markup/feedback 204 may be used to identify and correlate the CAD drawing 202 that is the subject of the markups 204. Alternatively, image mapping, a bar code, user input, etc. may be utilized to determine the appropriate CAD drawing 202. Thereafter, computer vision and/or other functions within the ML processing engine 200 may be used to orient, place, align, scale/size, register, and superimpose/position the markups 204 onto the drawing 202. Further, the identifier may be used to map multiple different versions of the document (e.g., into a 3D solid modeling application, a CAD application, etc.).

The ML processing engine 200 may be used to provide an autonomous/automated workflow where the recognized markups are processed into CAD application commands that can be used to perform the markups within the CAD application. Alternatively, such CAD application commands may be provided as suggestions (e.g., one or several possible options) for a user to accept/select and/or may be autonomously performed. If provided as suggestions, once selected by a user, the ML processing engine 200 may update the ML model based on the user's input, thereby improving the accuracy of the ML model and markup suggestions provided over time. It may be noted that the original ML model may be generated using synthetic/simulated data (e.g., synthetic markup data for one or more CAD drawings). Once completed, the updated CAD drawing 202R is generated for further use/modification by a CAD application designer/drafter.

In addition to the above, in one or more embodiments of the invention, the ML model may be run/executed/maintained locally on a client computer or alternatively, may be run/executed/maintained remotely on a server computer/cloud. In one or more embodiments, device and/or network capabilities may determine where the model is executed (e.g., if the local device is capable of executing the model, it may be maintained locally, and if not, it may be maintained remotely on a server and/or in the cloud). Alternatively, to provide a more comprehensive model that is used across multiple client installations of a CAD application, the model may be maintained/executed remotely on a server/ cloud that all (or a subset of) the local client installations access.

Figure 3:
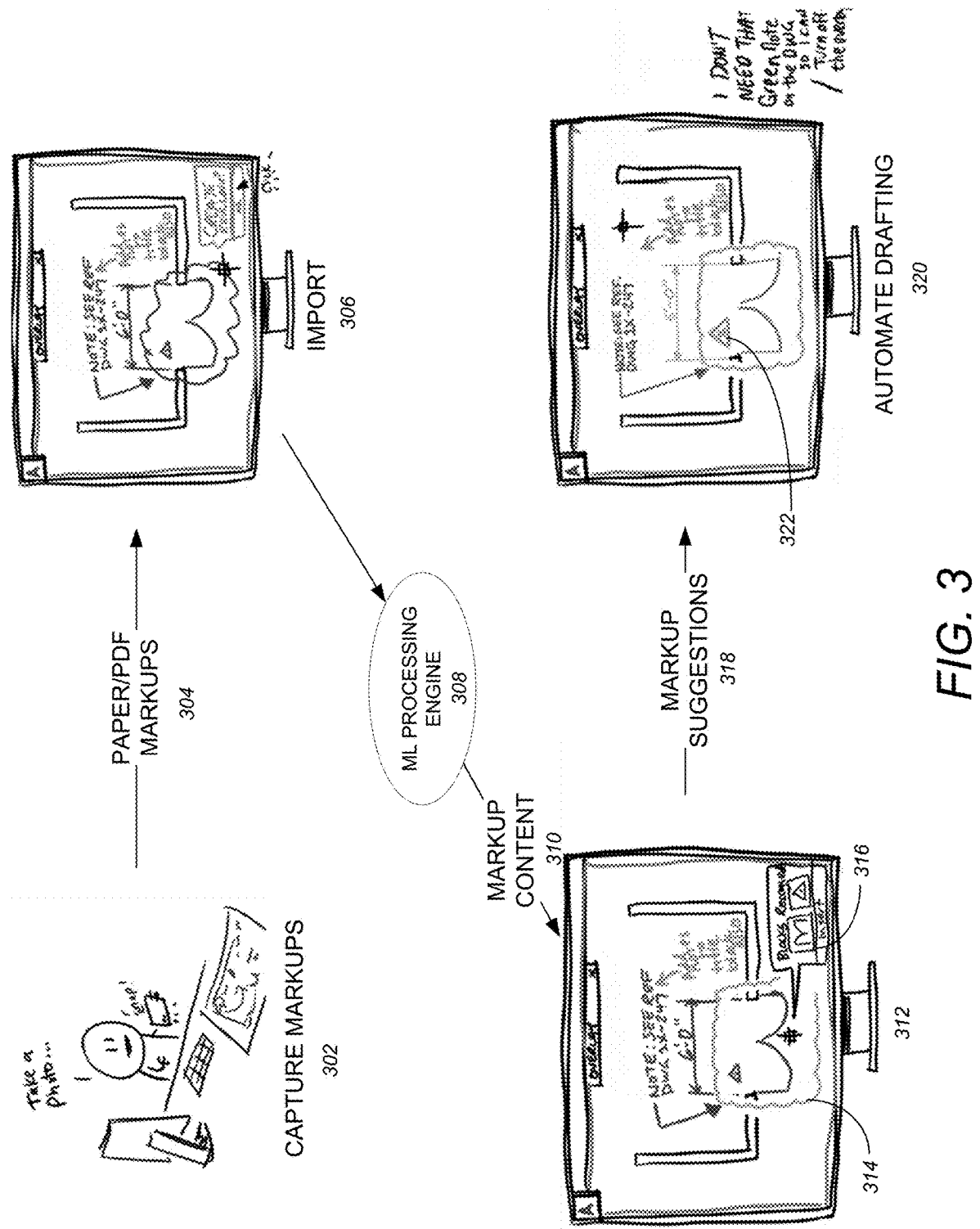
FIG. 3 illustrates an additional view of the exemplary workflow for the automated drafting process in accordance with one or more embodiments of the invention.

FIG. 3 illustrates an additional view of the exemplary workflow for the automated drafting process in accordance with one or more embodiments of the invention. The markups are captured at 302. For example, a photo of a drawing with markups may be captured or a PDF that includes the markups may be acquired/captured. The paper/PDF of the markups 304 may be imported 306 into an OVERLAY/ TRACE application/function/feature (e.g., of a CAD application). Such an OVERLAY/TRACE application/function/ feature provides a safe space in a CAD application where markups can exist within the context of the design CAD drawing, but not interfere with it. In other words, embodiments of the invention utilize a safe feature that allows a safe space for markup feedback to be stored and created without affecting the drawing contents/geometry.

The markups 304 are processed by the ML processing engine 308. Using ML, the ML processing engine 308 identifies the markup content 310 that can be used in a CAD application (e.g., dimensions, blocks, etc.). Not all of the markup content 310 is intended to be literally placed on the drawing as some are notes to the drafter and not for CAD drawing inclusion. Further, colors of markups may have meaning. Accordingly, embodiments of the invention may automate conversion of text notes intended to be placed on the drawing while ignoring other notes that are not.

Display screen 312 illustrates the recognition of different CAD application objects such as a revCloud 314 that has been placed on a desired layer (i.e., a CAD drawing layer) and recognized blocks 316 to be inserted into the drawing. At this juncture, the ML processing engine 308 may automatically perform the CAD drawing modifications/edits or alternatively, the command to perform the edits may be provided as suggestions 318 to a user. When provided as suggestions 318, the drafting process may be automated 320 by allowing one click placement of CAD application objects on the appropriate layers, styles, etc. (e.g., based on prior in-CAD drawing usage and prior selections—both of which may be used to modify the model used by the ML processing engine 308) based on the markup. For example, a prompt may provide a suggested markup 318 with the user having the option to one-click accept/decline the suggestion. If accepted, the suggested markup 318 may be automatically placed in accordance with the suggestion.

In one or more embodiments, within the OVERLAY/ TRACE feature/function/application, the recognized markup content 310 may be presented on an overlay which may appear visually similar to tracing paper that has been aligned and placed over a CAD drawing. Such an overlay may have a cloudy semi-transparent texture (e.g., similar to actual physical tracing paper). In one or more embodiments, such an OVERLAY/TRACE capability may be an embedded CAD drawing within the parent CAD drawing (i.e., it may be an embedded DWG file and not merely a layer within the DWG file). Once all markup suggestions 318 have been incorporated into the CAD drawing as desired by the user, the user may opt to turn off the overlay so that the handwritten notes/markups are no longer displayed (i.e., leaving just the CAD drawing with the desired incorporated markups displayed). For example, a user may determine that a green note 322 on the drawing may not be needed on the CAD drawing and therefore may turn off the overlay view that is displayed.

Mobile Device Processing Architecture

Figure 4:
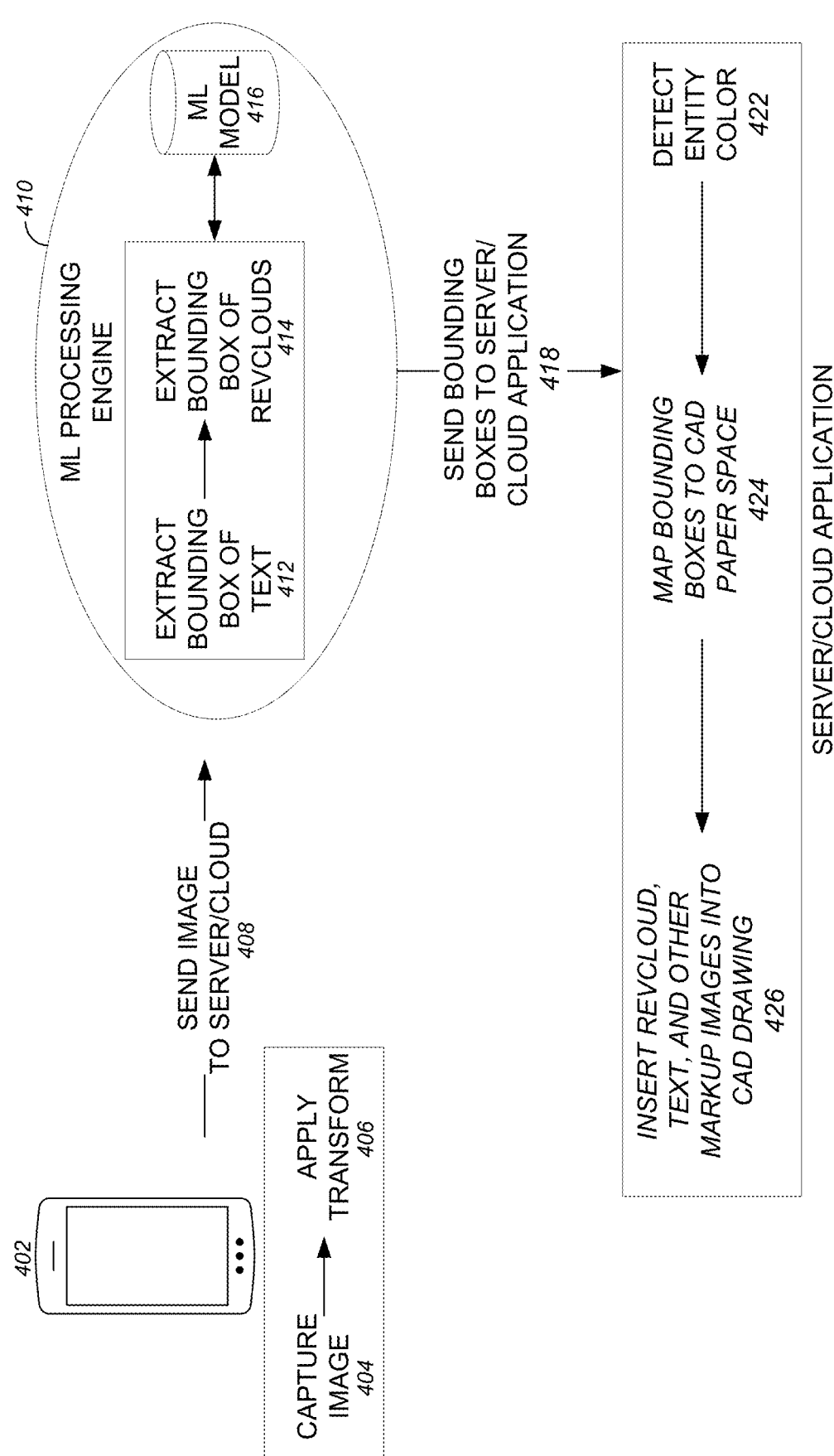
FIG. 4 illustrates a high level architecture for assisted drafting automation using machine learning via a mobile device in accordance with one or more embodiments of the invention.

Embodiments of the invention provide for assisted drafting automation using ML. As described above, the markups may be captured via a camera or other device with image capture capabilities (e.g., a mobile device). Once captured, various actions may be performed to provide for the drafting automation. FIG. 4 illustrates a high level architecture for assisted drafting automation using ML via a mobile device in accordance with one or more embodiments of the invention. As illustrated, a mobile device 402 captures an image (at 404) containing the markups and applies a transform at 406. The transform converts the captured image into a form acceptable for use by the ML processing engine 410. Consequently, the captured image is sent 408 to the server or cloud for processing by an ML processing engine 410. The ML processing engine 410 extracts bounding box(es) of text at 412 and bounding boxes of revClouds at 414. Such extraction 412 and 414 are based on an ML model 416.

The ML processing engine 410 sends (at 418) the bounding boxes to a server or cloud based application for further processing. In one or more embodiments the server/cloud application 420 is a CRX application (e.g., a browser extension). Within the server/cloud application 420, the bounding boxes are processed in steps 422-426. At step 422, an HSV (hue, saturation, value) detector (or other type of detector) is used to detect the color of entities within the bounding boxes. As an example, in addition to HSV and other color space based segmentation, image filters and other computer vision processing techniques could be applied in order to differentiate markup from background more accurately. In other words, embodiments of the invention map/move from RGB (red, green, blue) space to HSV space to segment the markups from the background of the drawing. At step 424, the bounding boxes (of revClouds and text) are mapped to the CAD application paper space (e.g., a paper layout of a drawing within a CAD application). At step 426, revClouds, text, and remaining markups (e.g., other markup images) are inserted as images into CAD drawings as a compound object on a CAD layer.

ML Processing Details

Figure 5:
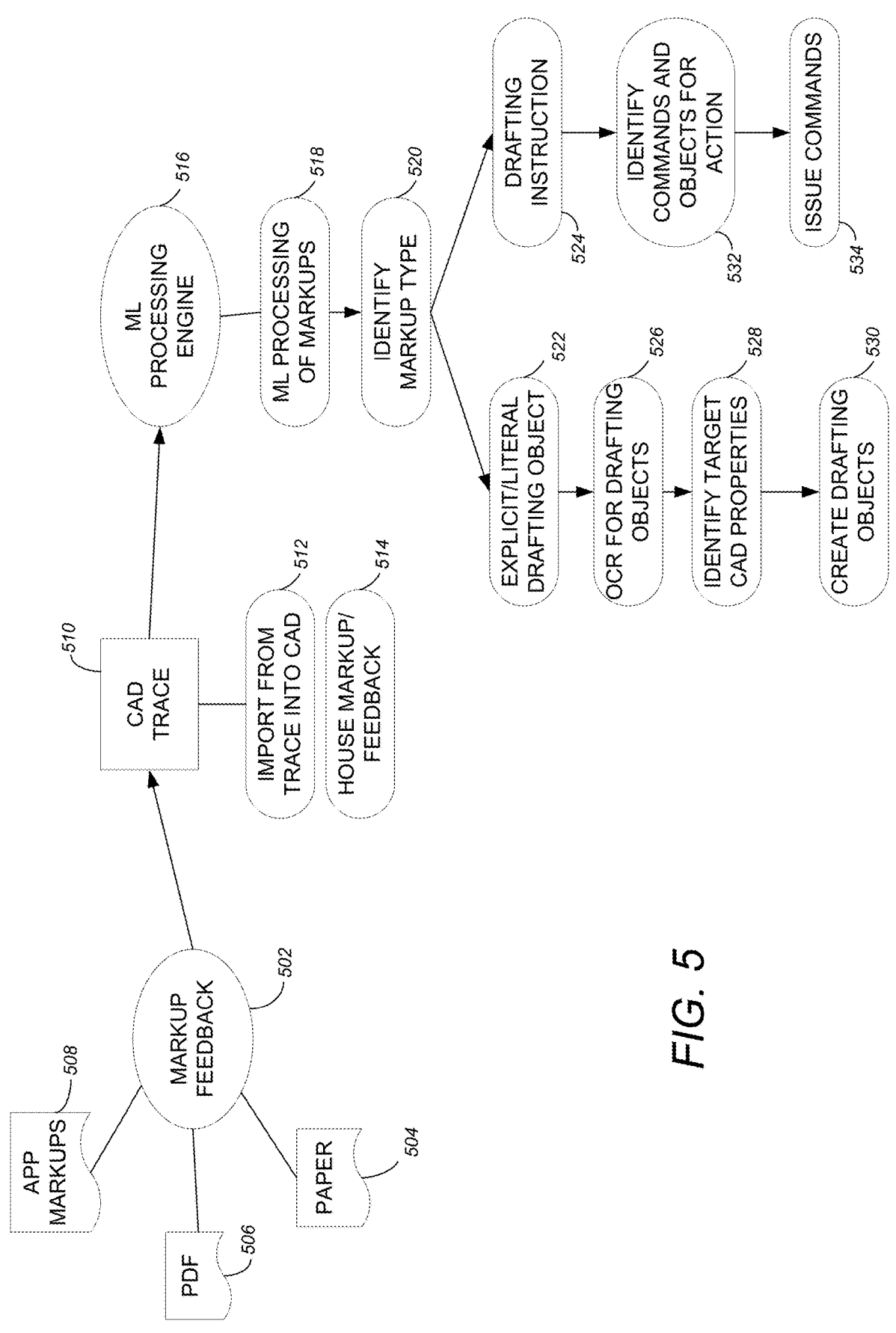
FIG. 5 illustrates further details for the logical flow and architecture for machine learning processing markups to assist in automated drafting in accordance with one or more embodiments of the invention.

FIG. 5 illustrates further details for the logical flow and architecture for ML processing markups to assist in automated drafting in accordance with one or more embodiments of the invention. The markup feedback 502 is input/received via paper 504, PDF 506, and/or a third party CAD/modeling/ construction software application 508 (e.g., the BIM360 application or a BIM [building information modeling] viewer application).

The primary CAD application 510 (e.g., the trace feature within a CAD application) receives/acquires the markup feedback 502. In one or more embodiments, such markup feedback 502 is imported 512 (e.g., from a trace feature within a CAD application into the CAD drawing itself (e.g., model space [MS] or paper space [PS]). In alternative embodiments, the markup feedback 502 may also include house markup/feedback 514 created within the primary CAD application 510.

The primary CAD application then requests/processes the markup feedback 502 in the ML processing engine 516. The ML Processing engine 516 performs the ML processing of markups at 518. The first step is to identify the markup type at 520. The markup type may be an explicit/literal drafting object 522 (e.g., a red markup where color is used to determine the markup type) or a drafting instruction 524 (e.g., a blue markup where color is used to determine the markup type). If the markup type is an explicit/literal drafting object 522, optical character recognition (OCR)

(e.g., via OCR application programming interfaces [APIs]) may be used to determine the text for the drafting objects at 524. Based on the OCR processing, the target CAD properties may be identified at 526 (e.g., the layer, style, etc.). For example, using object extraction and classification APIs, the drafting objects may be determined.

At 528, the appropriate drafting objects are created in the appropriate styling/standard. For example, the drafting object may consist of text, dimensions, blocks, revClouds, geometry, leaders, or any drafting object. In one or more embodiments, both ML and OCR are used to recognize the explicit/literal drafting object 522.

If the markup type is a drafting instruction 524, the appropriate command and objects to include in an action are identified at 532. For example, the appropriate command and objects may identify a markup instruction that specifies moving a selection of object by a set distance. At 534, the CAD application issues the command(s) (e.g., issues a move command and selects the objects specified within the appropriate distance). In this regard, with an explicit/literal markup 522, embodiments of the invention may launch CAD application commands to create and place/insert the markup drafting object at step 530 into the drawing. However, with a drafting instruction 524, the CAD application will interpret the instructions which could include launching a command and/or following the instructions at step 534. Further, for such a drafting instruction, the selection set may assume a selection boundary or other indicator of which entities are of interest.

In one or more embodiments, the markup remains in the CAD application "trace" space, separate from the CAD drawing geometry. Further drafting edits may be made in the geometry of the CAD drawing itself.

Logical Flow

Figure 6:
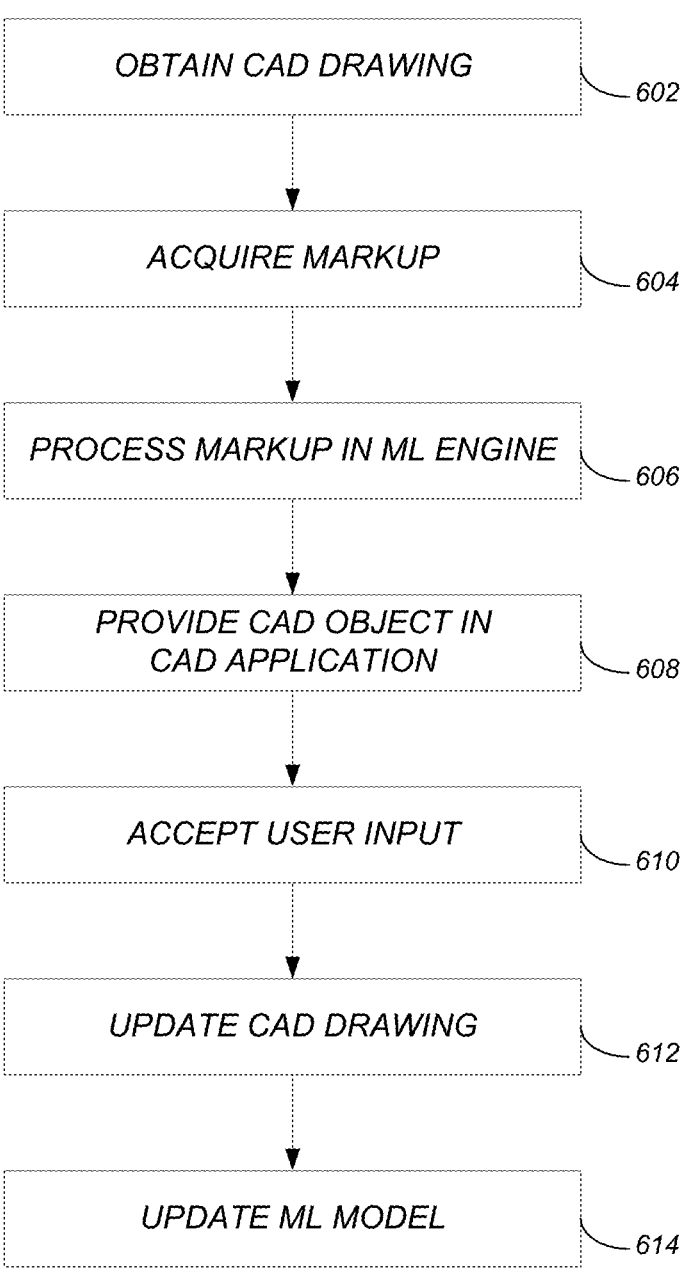
FIG. 6 illustrates the logical flow for CAD automation in accordance with one or more embodiments of the invention

FIG. 6 illustrates the logical flow for CAD automation in accordance with one or more embodiments of the invention.

At step 602, a CAD drawing is obtained in a first format that is native to a CAD application.

At step 604, markup for the CAD drawing is acquired. The markup is in a second format that is not native to the CAD application. In one or more embodiments, the markup is created using physical means to transcribe feedback on a paper printout of the CAD drawing. In such an embodiment, the markup is acquired by acquiring an image of the transcribed feedback on the paper printout (e.g., a scan/photograph of the image). In alternative embodiments, the markup may be created by digitally annotating a digital file comprising an image of the CAD drawing (e.g., a PDF).

At step 606, the markup is processed in a machine learning engine using a machine learning model. The processing identifies a markup type of the markup, identifies markup properties of the markup, correlates (based on the markup type) the markup type to a CAD object needed to update the CAD drawing, and determines (based on the markup type and the markup properties) CAD object properties for the CAD object and CAD application properties for the CAD application.

In one or more embodiments, the markup type may be a literal markup. With a literal markup type, the CAD object properties may be determined using optical character recognition (OCR) to recognize text, with the CAD object being provided based on the recognized text. Thereafter, the CAD drawing is updated by creating the CAD object. In such embodiments, the CAD application properties may include CAD standards including/such as a target layer and a style. Further, the CAD object may be created in/based on such CAD standards.

In one or more embodiments, the markup type may be a drafting instruction. With a drafting instruction, when providing the CAD object with the CAD object properties, the CAD application commands and CAD object necessary to perform the drafting instruction are identified. Thereafter, the CAD drawing is updated by executing the identified CAD application commands using the identified CAD object. In one or more embodiments, the drafting instruction consists of moving the CAD object by a set distance. Based on the instruction, a set of one or more CAD objects is selected (including the identified CAD object) and the CAD drawing is updated by issuing a move command on the set of one or more CAD objects using the set distance.

In on or more embodiments of the invention, the markup type is identified based on a color of the markup. For example, a first color may represent a literal markup type, and a second color may represent a drafting instruction markup type.

To process the markup, a first bounding box of text and a second bounding box of one or more geometric objects may be extracted. The bounding boxes may then be sent to a cloud based application for further processing. Such further processing may include detecting a color of each of the one or more entities in the first bounding box and the second bounding box, determining the markup type based on the colors, mapping the first bounding box and the second bounding box to a paper space of the CAD application. Thereafter, based on the markup type, the color of each of the one or more entities in the first bounding box and the second bounding box may be mapped to representative CAD application colors. Further, the CAD drawing may be updated based on the text, the one or more geometric objects, the markup type, and the representative CAD application colors.

At step 608, the CAD object (with the CAD object properties) is provided/presented in the CAD application using the CAD application properties.

At step 610, user input is accepted in response to the providing step 608.

At step 612, the CAD drawing is updated in the CAD application based on the user input.

At step 614, the ML model is updated based on the user input (e.g., feedback such as accepting suggestions and/or rejecting suggestions). Such an updated ML model is utilized to process future markups.

Hardware Environment

Figure 7:
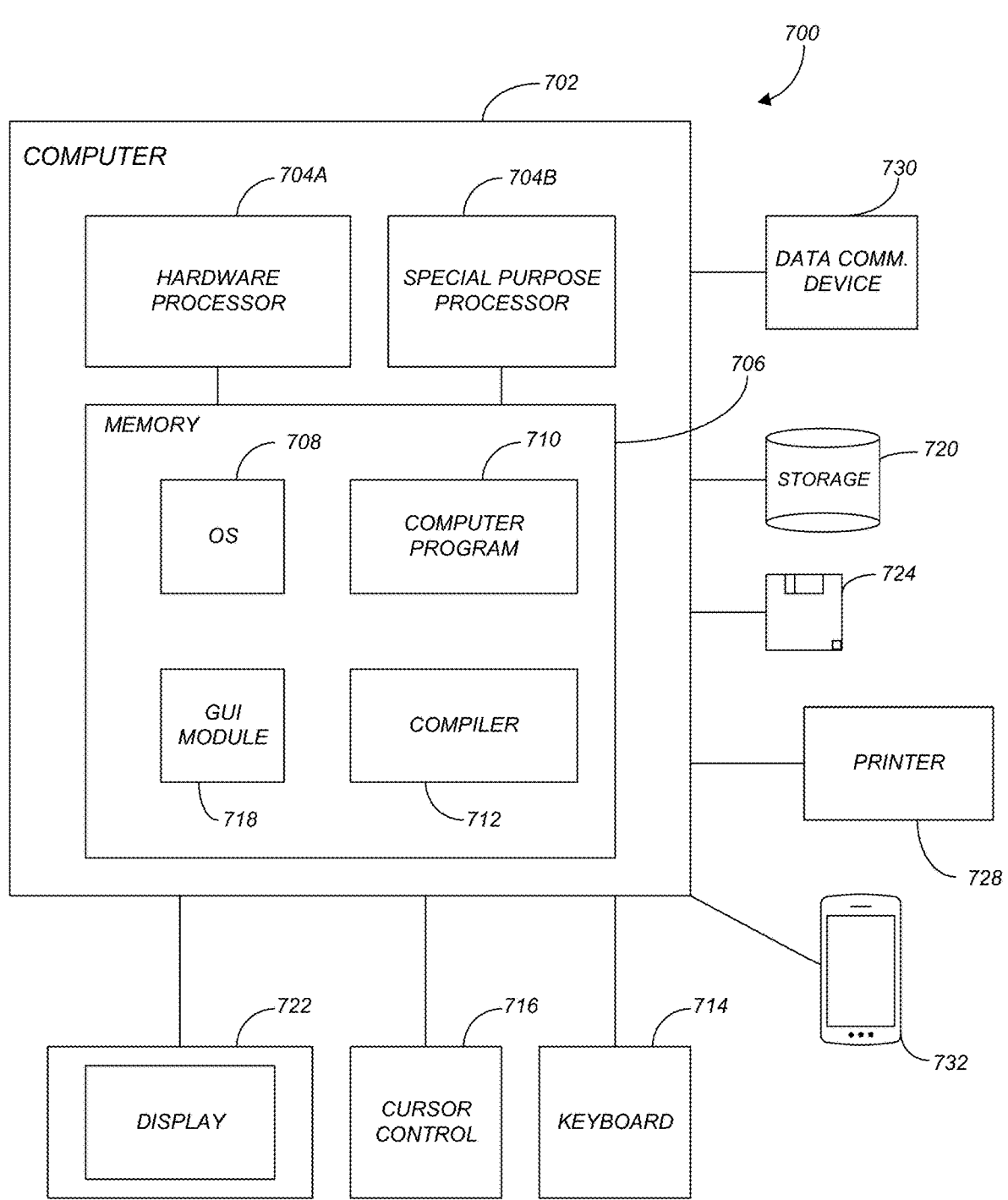
FIG. 7 is an exemplary hardware and software environment used to implement one or more embodiments of the invention.

FIG. 7 is an exemplary hardware and software environment 700 (referred to as a computer-implemented system and/or computer-implemented method) used to implement one or more embodiments of the invention. The hardware and software environment includes a computer 702 and may include peripherals. Computer 702 may be a user/client computer, server computer, or may be a database computer. The computer 702 comprises a hardware processor 704A and/or a special purpose hardware processor 704B (hereinafter alternatively collectively referred to as processor 704) and a memory 706, such as random access memory (RAM). The computer 702 may be coupled to, and/or integrated with, other devices, including input/output (I/O) devices such as a keyboard 714, a cursor control device 716 (e.g., a mouse, a pointing device, pen and tablet, touch screen, multi-touch device, etc.) and a printer 728. In one or more embodiments, computer 702 may be coupled to, or may comprise, a portable or media viewing/listening device 732 (e.g., an MP3 player, IPOD, NOOK, portable digital video player, cellular device, personal digital assistant, etc.). In yet another embodiment, the computer 702 may comprise a multi-touch device, mobile phone, gaming system, internet enabled television, television set top box, or other internet enabled device executing on various platforms and operating systems.

In one embodiment, the computer 702 operates by the hardware processor 704A performing instructions defined by the computer program 710 (e.g., a computer-aided design [CAD] application) under control of an operating system 708. The computer program 710 and/or the operating system 708 may be stored in the memory 706 and may interface with the user and/or other devices to accept input and commands and, based on such input and commands and the instructions defined by the computer program 710 and operating system 708, to provide output and results.

Output/results may be presented on the display 722 or provided to another device for presentation or further processing or action. In one embodiment, the display 722 comprises a liquid crystal display (LCD) having a plurality of separately addressable liquid crystals. Alternatively, the display 722 may comprise a light emitting diode (LED) display having clusters of red, green and blue diodes driven together to form full-color pixels. Each liquid crystal or pixel of the display 722 changes to an opaque or translucent state to form a part of the image on the display in response to the data or information generated by the processor 704 from the application of the instructions of the computer program 710 and/or operating system 708 to the input and commands. The image may be provided through a graphical user interface (GUI) module 718. Although the GUI module 718 is depicted as a separate module, the instructions performing the GUI functions can be resident or distributed in the operating system 708, the computer program 710, or implemented with special purpose memory and processors.

In one or more embodiments, the display 722 is integrated with/into the computer 702 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 702 according to the computer program 710 instructions may be implemented in a special purpose processor 704B. In this embodiment, some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program 710 instructions. In one embodiment, the special purpose processor 704B is an application specific integrated circuit (ASIC).

The computer 702 may also implement a compiler 712 that allows an application or computer program 710 written in a programming language such as C, C++, Assembly, SQL, PYTHON, PROLOG, MATLAB, RUBY, RAILS, HASKELL, or other language to be translated into processor 704 readable code. Alternatively, the compiler 712 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 710 accesses and manipulates data accepted from I/O devices and stored in the memory 706 of the computer 702 using the relationships and logic that were generated using the compiler 712.

The computer 702 also optionally comprises an external communication device such as a modem, satellite link, Ethernet card, or other device for accepting input from, and providing output to, other computers 702.

In one embodiment, instructions implementing the operating system 708, the computer program 710, and the compiler 712 are tangibly embodied in a non-transitory computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of computer program 710 instructions which, when accessed, read and executed by the computer 702, cause the computer 702 to perform the steps necessary to implement and/or use the present invention or to load the program of instructions into a memory 706, thus creating a special purpose data structure causing the computer 702 to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 702.

Figure 8:
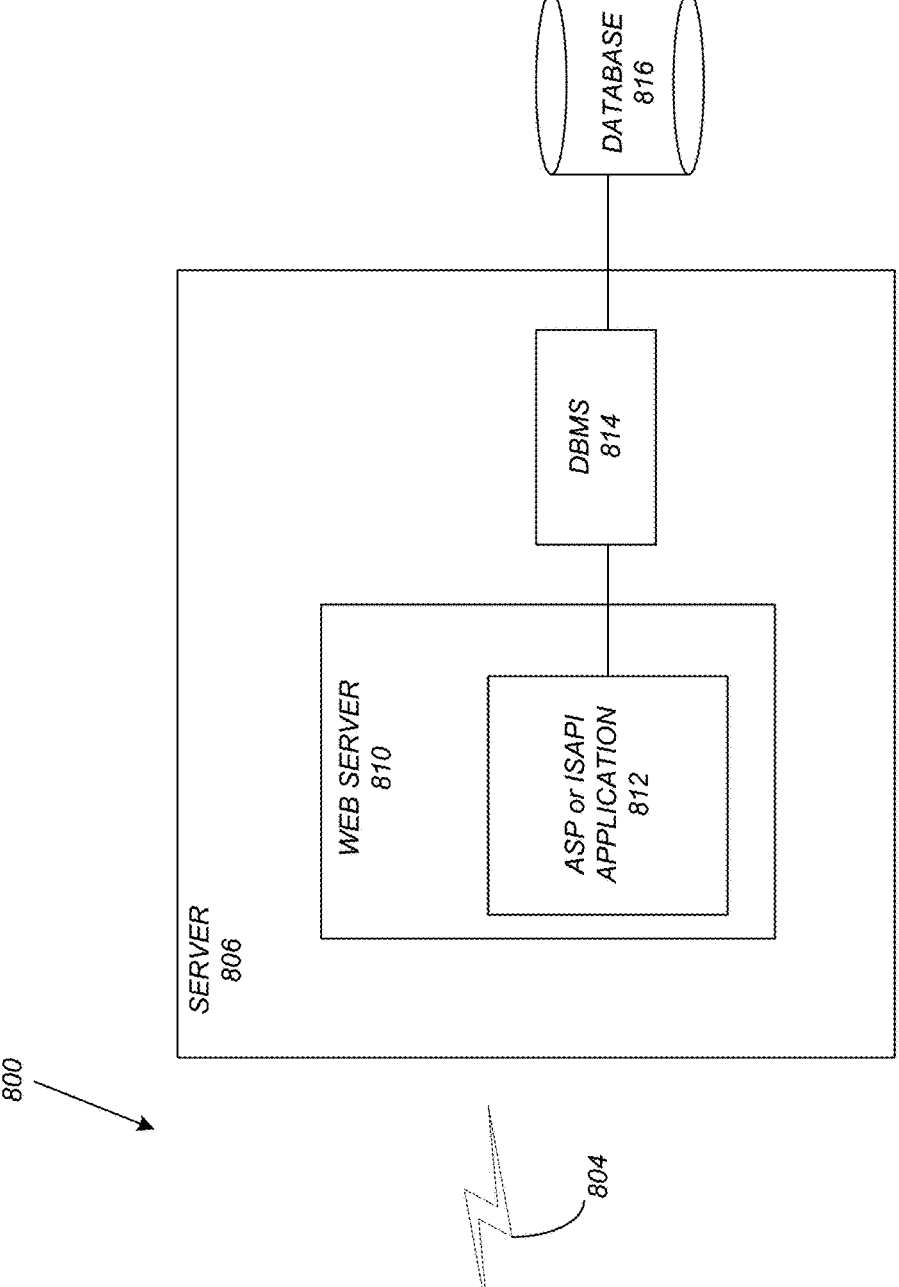
FIG. 8 schematically illustrates a typical distributed/cloud-based computer system in accordance with one or more embodiments of the invention.

FIG. 8 schematically illustrates a typical distributed/cloud-based computer system 800 using a network 804 to connect client computers 802 to server computers 806. A typical combination of resources may include a network 804 comprising the Internet, LANs (local area networks), WANs (wide area networks), SNA (systems network architecture) networks, or the like, clients 802 that are personal computers or workstations (as set forth in FIG. 7), and servers 806 that are personal computers, workstations, minicomputers, or mainframes (as set forth in FIG. 7). However, it may be noted that different networks such as a cellular network (e.g., GSM [global system for mobile communications] or otherwise), a satellite based network, or any other type of network may be used to connect clients 802 and servers 806 in accordance with embodiments of the invention.

A network 804 such as the Internet connects clients 802 to server computers 806. Network 804 may utilize ethernet, coaxial cable, wireless communications, radio frequency (RF), etc. to connect and provide the communication between clients 802 and servers 806. Further, in a cloud-based computing system, resources (e.g., storage, processors, applications, memory, infrastructure, etc.) in clients

802 and server computers 806 may be shared by clients 802, server computers 806, and users across one or more networks. Resources may be shared by multiple users and can be dynamically reallocated per demand. In this regard, cloud computing may be referred to as a model for enabling access to a shared pool of configurable computing resources.

Clients 802 may execute a client application or web browser and communicate with server computers 806 executing web servers 810. Such a web browser is typically a program such as MICROSOFT INTERNET EXPLORER/ EDGE, MOZILLA FIREFOX, OPERA, APPLE SAFARI, GOOGLE CHROME, etc. Further, the software executing on clients 802 may be downloaded from server computer 806 to client computers 802 and installed as a plug-in or ACTIVEX control of a web browser. Accordingly, clients 802 may utilize ACTIVEX components/component object model (COM) or distributed COM (DCOM) components to provide a user interface on a display of client 802. The web server 810 is typically a program such as MICROSOFT'S INTERNET INFORMATION SERVER.

Web server 810 may host an Active Server Page (ASP) or Internet Server Application Programming Interface (ISAPI) application 812, which may be executing scripts. The scripts invoke objects that execute business logic (referred to as business objects). The business objects then manipulate data in database 816 through a database management system (DBMS) 814. Alternatively, database 816 may be part of, or connected directly to, client 802 instead of communicating/ obtaining the information from database 816 across network 804. When a developer encapsulates the business functionality into objects, the system may be referred to as a component object model (COM) system. Accordingly, the scripts executing on web server 810 (and/or application 812) invoke COM objects that implement the business logic. Further, server 806 may utilize MICROSOFT'S TRANSACTION SERVER (MTS) to access required data stored in database 816 via an interface such as ADO (Active Data Objects), OLE DB (Object Linking and Embedding DataBase), or ODBC (Open DataBase Connectivity).

Generally, these components 800-816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 802 and 806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 802 and 806. Embodiments of the invention are implemented as a software/CAD application on a client 802 or server computer 806. Further, as described above, the client 802 or server computer 806 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for computer aided drawing (CAD) automation, comprising:

(a) obtaining the CAD drawing, wherein the CAD drawing is in a first format that is native to a CAD application;

(b) acquiring a first markup and a second markup on an image of the CAD drawing, wherein:

(i) the first markup and the second markup are both in a second format that is not native to the CAD application;

(ii) the first markup and the second markup each have a markup type;

(iii) the markup type is either a literal drafting object to be added to the CAD drawing or a drafting instruction to modify the CAD drawing;

(c) processing, in a machine learning engine, the first markup and the second markup, using a machine learning model, to:

(i) identify the markup type of the first markup, wherein the markup type comprises the drafting instruction to modify the CAD drawing;

(ii) identify the markup type of the second markup as the literal drafting object;

(iii) identify markup properties of the first markup and the second markup;

(iv) correlate, based on the markup types, the first markup to a first CAD object needed to update the CAD drawing, and the second markup to a second CAD object needed to update the CAD drawing;

(v) determine, based on the markup types and the markup properties, CAD object properties for the first CAD object and the second CAD object and CAD application properties for the CAD application; and (d) providing, in the CAD application using the CAD application properties, the first CAD object and the second CAD object with the CAD object properties, wherein the providing comprises:

(i) identifying one or more CAD application commands necessary to perform the drafting instruction;

(ii) identifying the first CAD object necessary to perform the drafting instruction; and (iii) identifying the second CAD object to be added to the CAD drawing;

(e) accepting user input in response to the providing;

(f) updating, in the CAD application, the CAD drawing based on the user input, wherein the updating the CAD drawing comprises:

(i) executing the identified one or more CAD application commands using the first identified CAD object; and (ii) creating the second CAD object in the CAD drawing; and (g) updating the machine learning model based on the user input, wherein the machine learning model is utilized to process future markups.

2. The computer-implemented method of claim 1, wherein:

the first markup and the second markup were created using physical means to transcribe feedback on a paper printout of the CAD drawing; and the acquiring comprises acquiring an image of the transcribed feedback on the paper printout.

3. The computer-implemented method of claim 1, wherein:

the first markup and the second markup were created by digitally annotating a digital file comprising the image of the CAD drawing.

4. The computer-implemented method of claim 1, wherein:

the CAD object properties for the second CAD object are determined using optical character recognition (OCR) to recognize text; and the providing comprises providing the second CAD object based on the recognized text.

5. The computer-implemented method of claim 4, wherein:

the CAD application properties comprise one or more CAD standards including a target layer and a style;

the second CAD object is created in the one or more CAD standards.

6. The computer-implemented method of claim 1, wherein:

the drafting instruction comprises moving the first CAD object by a set distance;

the identifying the first CAD object comprises selecting a set of one or more CAD objects, wherein the set includes the identified first CAD object; and the updating the CAD drawing comprises issuing a move command on the set of one or more CAD objects using the set distance.

7. The computer-implemented method of claim 1, wherein:

the identifying the markup type is based on a color of the markup;

a first color represents the markup type comprising the literal markup; and a second color represents the markup type comprising the drafting instruction.

8. The computer-implemented method of claim 1, wherein the processing the markup comprises:

extracting a first bounding box of text;

extracting a second bounding box of one or more geometric objects;

sending the first bounding box and the second bounding box to a cloud based application;

the cloud based application:

detecting a color of the one text in the first bounding box and the one or more geometric objects in the second bounding box;

determining the markup type based on the colors;

mapping the first bounding box and the second bounding box to a paper space of the CAD application; and

updating the CAD drawing based on the text, the one or more geometric objects, the markup type, and the representative CAD application colors.

9. A computer-implemented system for computer aided drawing (CAD) automation, comprising:

(a) a computer having a memory;

(b) a processor executing on the computer;

(c) the memory storing a set of instructions, wherein the set of instructions, when executed by the processor cause the processor to perform operations comprising:

(i) obtaining the CAD drawing, wherein the CAD drawing is in a first format that is native to a CAD application;

(ii) acquiring first markup and a second markup on an image of the CAD drawing, wherein:

(1) the first markup and the second markup are both in a second format that is not native to the CAD application;

(2) the first markup and the second markup each have a markup type;

(3) the markup type is either a literal drafting object to be added to the CAD drawing or a drafting instruction to modify the CAD drawing;

(iii) processing, in a machine learning engine, the first markup and the second markup, using a machine learning model, to:

(1) identify the markup type of the first markup, wherein the markup type comprises the drafting instruction to modify the CAD drawing;

(2) identify the markup type of the second markup as the literal drafting object;

(3) identify markup properties of the first markup and the second markup;

(4) correlate, based on the markup types, the first markup to a first CAD object needed to update the CAD drawing, and the second markup to a second CAD object needed to update the CAD drawing;

(5) determine, based on the markup types and the markup properties, CAD object properties for the first CAD object and the second CAD object and CAD application properties for the CAD application; and (iv) providing, in the CAD application using the CAD application properties, the first CAD object and the second CAD object with the CAD object properties, wherein the providing comprises:

(1) identifying one or more CAD application commands necessary to perform the drafting instruction;

(2) identifying the first CAD object necessary to perform the drafting instruction; and (3) identifying the second CAD object to be added to the CAD drawing;

(v) accepting user input in response to the providing;

(vi) updating, in the CAD application, the CAD drawing based on the user input, wherein the updating the CAD drawing comprises:

(1) executing the identified one or more CAD application commands using the first identified CAD object; and (2) creating the second CAD object in the CAD drawing; and (vii) updating the machine learning model based on the user input, wherein the machine learning model is utilized to process future markups.

10. The computer-implemented system of claim 9, wherein:

the first markup and the second markup were created using physical means to transcribe feedback on a paper printout of the CAD drawing; and the acquiring comprises acquiring an image of the transcribed feedback on the paper printout.

11. The computer-implemented system of claim 9, wherein:

the first markup and the second markup were created by digitally annotating a digital file comprising the image of the CAD drawing.

12. The computer-implemented system of claim 9, wherein:

the CAD object properties for the second CAD object are determined using optical character recognition (OCR) to recognize text; and the providing comprises providing the second CAD object based on the recognized text.

13. The computer-implemented system of claim 12, wherein:

the CAD application properties comprise one or more CAD standards including a target layer and a style;

the second CAD object is created in the one or more CAD standards.

14. The computer-implemented system of claim 9, wherein:

the drafting instruction comprises moving the first CAD object by a set distance;

the identifying the first CAD object comprises selecting a set of one or more CAD objects, wherein the set includes the identified first CAD object; and the updating the CAD drawing comprises issuing a move command on the set of one or more CAD objects using the set distance.

15. The computer-implemented system of claim 9, wherein:

the identifying the markup type is based on a color of the markup;

a first color represents the markup type comprising the literal markup; and a second color represents the markup type comprising the drafting instruction.

16. The computer-implemented system of claim 9, wherein the processing the markup comprises:

extracting a first bounding box of text;

extracting a second bounding box of one or more geometric objects;

sending the first bounding box and the second bounding box to a cloud based application;

the cloud based application:

detecting a color of the text in the first bounding box and the one or more geometric objects in the second bounding box;

determining the markup type based on the colors;

mapping the first bounding box and the second bounding box to a paper space of the CAD application; and updating the CAD drawing based on the text, the one or more geometric objects, the markup type, and the representative CAD application colors.

* * * * *